United States Patent [19]
Charny

[11] Patent Number: 6,102,194
[45] Date of Patent: Aug. 15, 2000

[54] PALLET TYPE TRANSFER DEVICE

[75] Inventor: John Charny, Richmond Heights, Ohio

[73] Assignee: Belcan Corporation, Cincinnati, Ohio

[21] Appl. No.: 09/250,919

[22] Filed: Feb. 16, 1999

[51] Int. Cl.$^7$ .................................................. B65G 35/08
[52] U.S. Cl. ................. 198/795; 198/867.13; 198/465.3
[58] Field of Search .............................. 198/465.1, 465.3, 198/867.13, 795

[56] References Cited

U.S. PATENT DOCUMENTS

| | | | |
|---|---|---|---|
| 2,789,683 | 4/1957 | Stahl | 198/795 X |
| 3,666,076 | 5/1972 | Miller et al. | |
| 4,605,121 | 8/1986 | Wahren | |
| 4,852,718 | 8/1989 | Kunstmann | |
| 4,974,519 | 12/1990 | Miletto | |
| 5,222,587 | 6/1993 | Chevalier et al. | |
| 5,372,240 | 12/1994 | Weskamp | 198/867.13 X |
| 5,398,802 | 3/1995 | Llopton | 198/465.1 |

*Primary Examiner*—James R. Bidwell
*Attorney, Agent, or Firm*—James A. Hudak

[57] ABSTRACT

A pallet type transfer device utilized to transport parts or components along a conveyor-type assembly line is disclosed. The pallet type transfer device includes a body member having a rear bumper member with a pair of oppositely disposed idler wheels rotatably mounted thereto and having a front bumper member attached to the front surface thereof. The top surface of the rear bumper member is inclined upwardly towards the rear surface of the body member. Parallel, longitudinally extending, spaced-apart complementary grooves are provided on the bottom surface of the body member, each groove having a conveyor belt received therein. When a "moving" pallet type transfer device contacts a "stopped" transfer device along the assembly line, the front bumper of the "moving" transfer device contacts and moves laterally on the inclined top surface on the rear bumper member on the "stopped" transfer device causing the body member of the "moving" transfer device to move slightly upwardly resulting in the complementary grooves on the bottom surface thereof becoming disengaged from the conveyor belts, thus minimizing or eliminating wear to the belts and to the bottom surface of the "moving" transfer device. The conveyor belts continue to move within grooves provided within the idler wheels, however, the belts do not contact the complementary grooves provided in the bottom surface of the body member of the "moving" transfer device which has now been stopped.

9 Claims, 5 Drawing Sheets

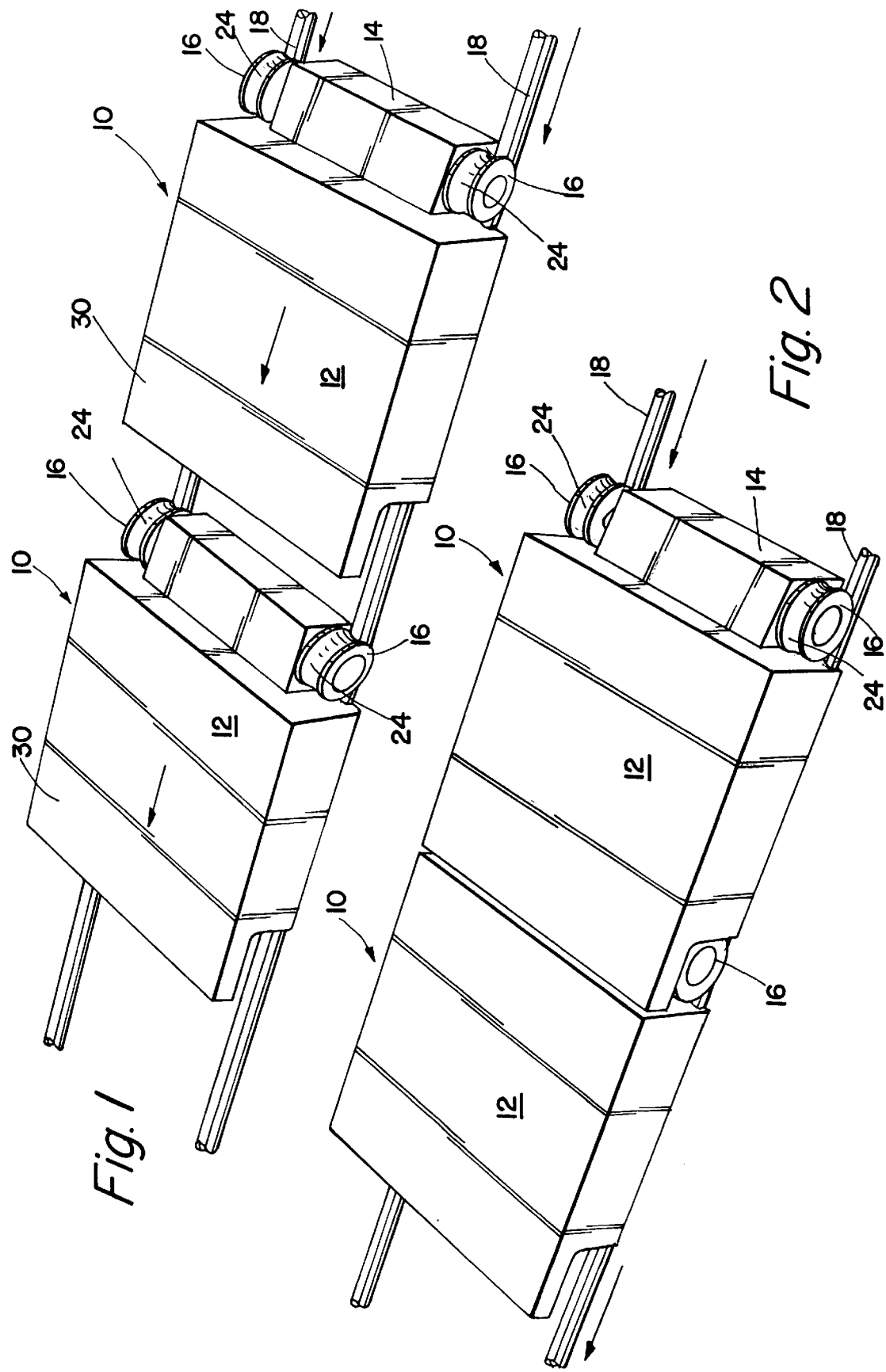

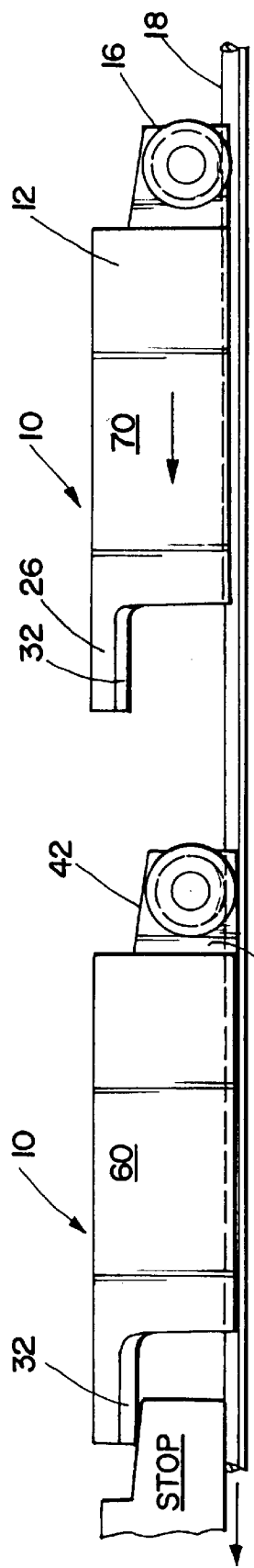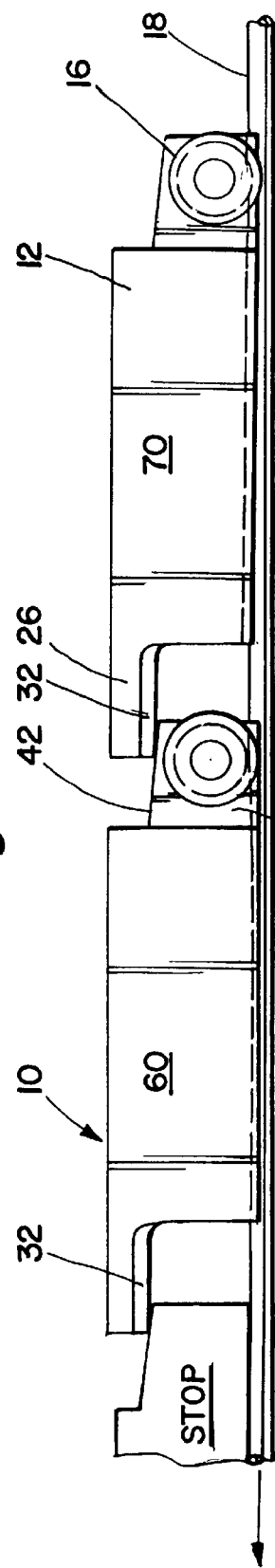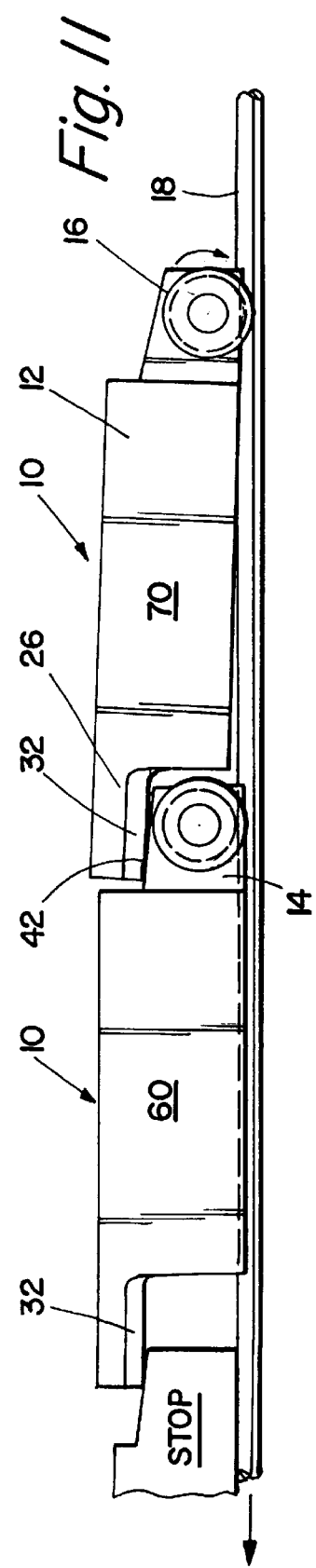

though FIGS. 1 and 2 are top perspective views of two (2) pallet type transfer devices 10 of the

PALLET TYPE TRANSFER DEVICE

TECHNICAL FIELD

The present invention relates, in general, to a pallet type transfer device utilized to transport parts or components along a conveyor-type assembly line and, more particularly, to a pallet type transfer device which minimizes wear to the conveyor belts and to the transfer device when the transfer device is stopped along the assembly line.

BACKGROUND ART

Parts or components are typically transported along a conveyor-type assembly line by means of a small movable platform, known as a pallet. The pallet is stopped at various locations along the assembly line so that some type of assembly operation can be performed. When the pallets are stopped along the assembly line, the conveyor belts under the pallets typically continue to move relative to the pallets resulting in wear to the top surface of the belts and to the bottom surface of the pallets.

In a typical assembly line installation, the pallets are placed on moving belts on a conveyor. The belts are solid, have a circular cross-section, are positioned in a parallel spaced-apart relationship and move parallel to the longitudinal axis of the conveyor. Typically, each belt is received within a groove located on the bottom surface of the pallet gripping same permitting the pallet to be transported along the assembly line until it contacts a "stop" or until it contacts another pallet which has been stopped. When a moving pallet contacts a "stop" or contacts another pallet which has been stopped, the moving pallet is subjected to shock loading. Thus, in a typical assembly line installation utilizing presently available pallets, the abrupt stopping of a pallet causes the pallet to be subjected to shock resulting in the jarring of the parts or components being transported thereby. In addition, after the pallet has been stopped, wear occurs to the conveyor belts and to the grooves on the bottom surface of the pallet since the belts continue to move with respect to the stopped pallet.

In view of the foregoing, it has become desirable to develop a pallet type transfer device which minimizes or eliminates wear to the conveyor belts and to the bottom surface of the pallet when the pallet is in the "stopped" condition and which minimizes the shock which occurs when a pallet contacts a "stop" or another pallet which has been stopped along the conveyor line.

SUMMARY OF THE INVENTION

The present invention solves the problems associated with prior art pallet type transfer devices and other problems by providing a pallet structure which minimizes or eliminates wear to the conveyor belts and to the bottom surface of the pallet when the pallet has been "stopped" and which also minimizes shock to the pallet during the stopping process. The pallet type transfer device of the present invention is comprised of a body member having a rear bumper member with a pair of oppositely disposed idler wheels rotatably mounted thereto and having a substantially flat front bumper attached to the underside of a flanged surface on the front of the body member. The top surface of the rear bumper is inclined upwardly towards the rear surface of the body member. Parallel, longitudinally extending, spaced-apart complementary grooves are provided on the bottom surface of the body member, each groove having a conveyor belt being received therein. When a "moving" pallet type transfer device of the present invention contacts a "stopped" pallet type transfer device or contacts a "stop" along the conveyor type assembly line, the front bumper of the "moving" pallet type transfer device contacts and laterally moves on the inclined surface of the rear bumper on the "stopped" transfer device or on the "stop" provided on the assembly line minimizing any shock to the "moving" pallet type transfer device. Further movement of the "moving" transfer device relative to the "stopped" transfer device results in lateral movement of the front bumper on the "moving" transfer device relative to the inclined surface of the rear bumper on the "stopped" transfer device causing the body member of the "moving" transfer device to move slightly upwardly about its idler wheels resulting in the complementary grooves on the bottom surface thereof to become disengaged from the conveyor belts. The conveyor belts continue to move laterally causing the idler wheels on the "moving" transfer device, which has now been stopped, to rotate, however, the belts do not contact the complementary grooves provided in the bottom surface of the body member of the "moving" transfer device, which has now been stopped, minimizing or eliminating wear to the belts and to the bottom surface thereof.

BRIEF DESCRIPTION OF THE DRAWINGS

FIG. 1 is a top perspective view of two (2) transfer devices of the present invention in a disengaged condition.

FIG. 2 is a top perspective view of two (2) transfer devices of the present invention in the engaged condition.

FIGS. 9–11 are a sequence of side elevational views of two (2) transfer devices of the present invention and illustrate the lateral movement of a "moving" transfer device in relation to a "stopped" transfer device, the commencement of the engagement of the "moving" transfer device with the "stopped" transfer device and the upward movement of the body of the "moving" transfer device relative to the "stopped" transfer device as a result of the engagement of the "moving" transfer device with the "stopped" transfer device.

DESCRIPTION OF THE PREFERRED EMBODIMENT

Figure 12:
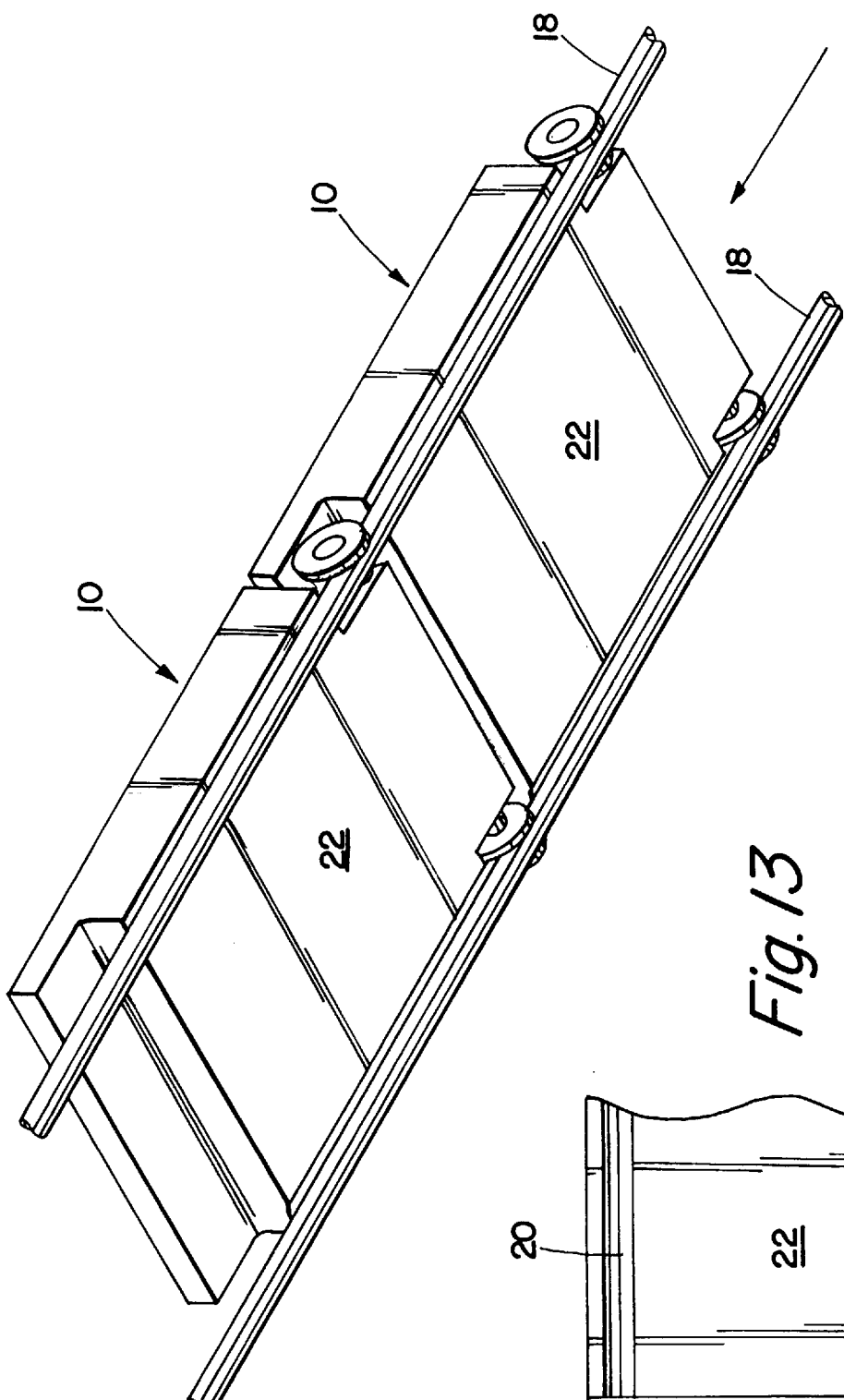
FIG. 12 is a bottom perspective view of two (2) transfer devices of the present invention in the engaged condition.
Figure 13:
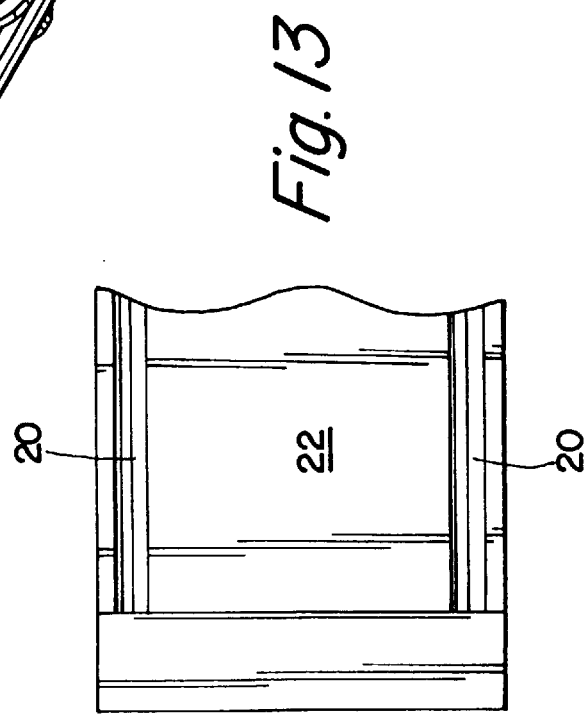
FIG. 13 is a fragmentary partial bottom plan view of the transfer device of the present invention.

Referring now to the drawings where the illustrations are for the purpose of describing the preferred embodiment of the present invention and are not intended to limit the invention described herein, FIGS. 1 and 2 are top perspective views of two (2) pallet type transfer devices 10 of the present invention in a disengaged and engaged condition, respectively. The transfer device 10 is comprised of a body member 12, a rear bumper member 14 and a pair of oppositely disposed idler wheels 16 rotatably mounted to the rear bumper member 14. The transfer device 10 is conveyed along a conveyor or assembly line by means of parallel, longitudinally directed, spaced-apart belts 18, each belt being received within a complementary groove 20 provided on the bottom surface 22 of the body member 12, as shown in FIGS. 12 and 13, and also being received within a groove 24 provided in an idler wheel 16.

Figure 3:
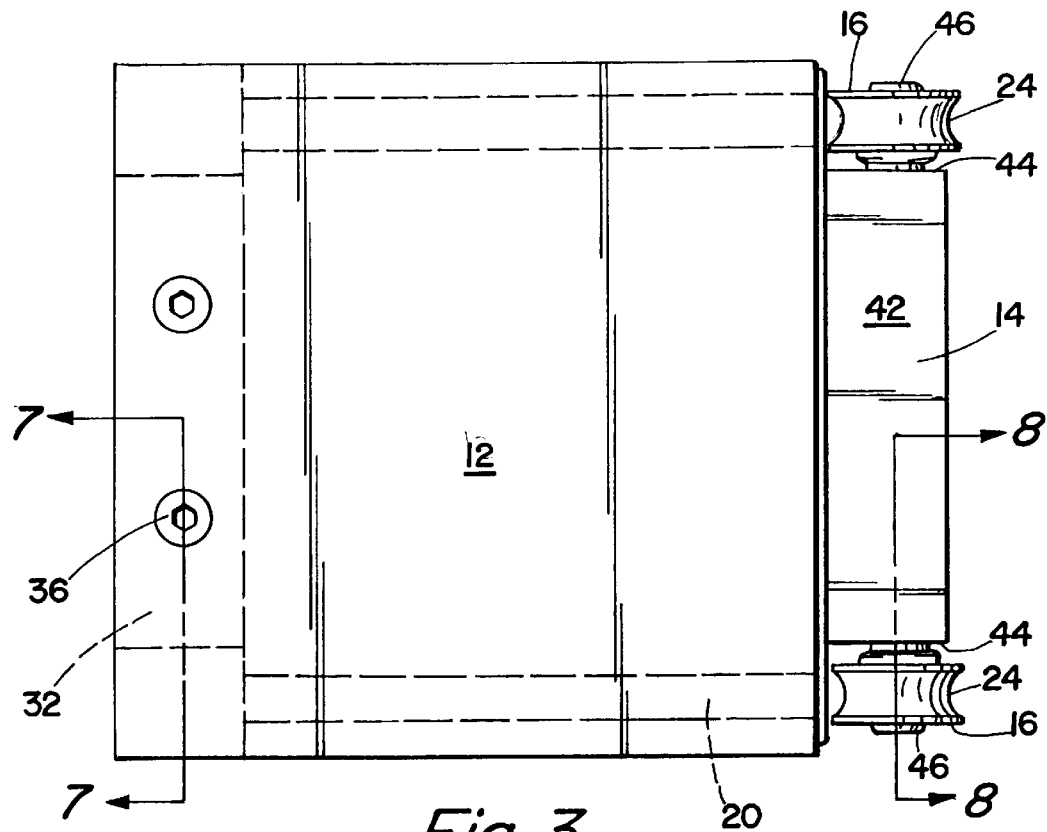
FIG. 3 is a top plan view of the transfer device of the present invention.
Figure 4:
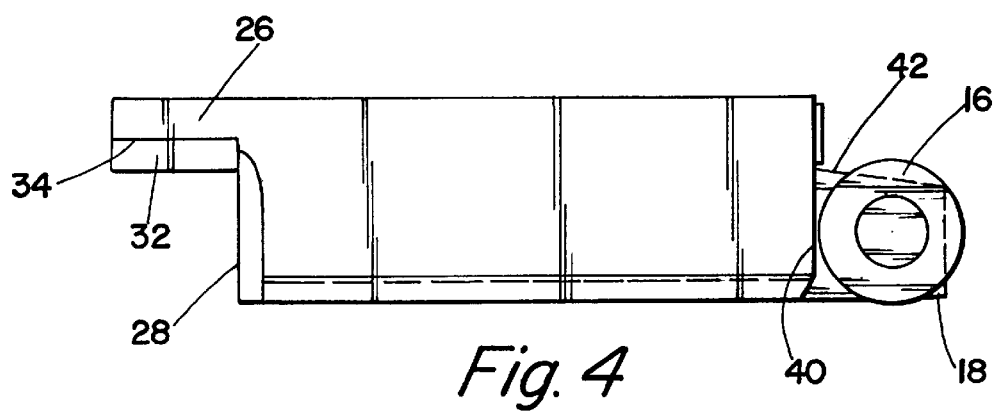
FIG. 4 is a side elevational view of the transfer device of the present invention.
Figure 5:
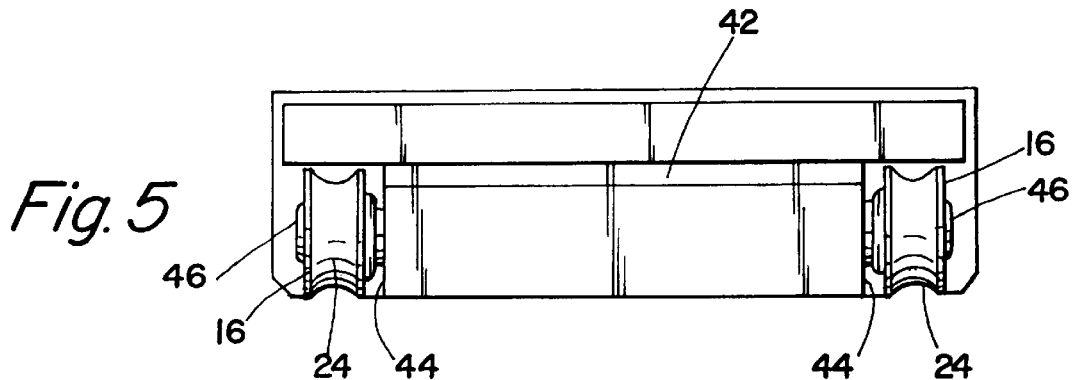
FIG. 5 is a rear elevational view of the transfer device of the present invention.
Figure 6:
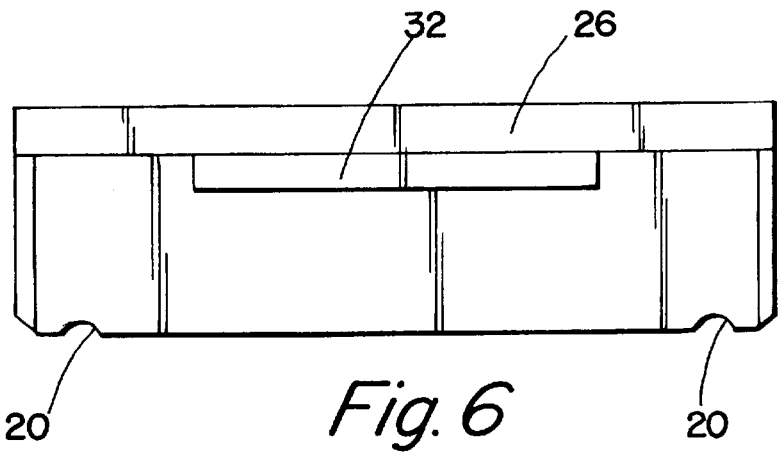
FIG. 6 is a front elevational view of the transfer device of the present invention.
Figure 7:
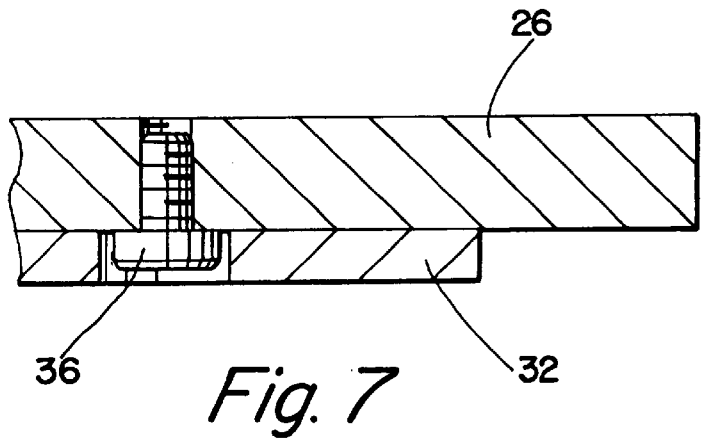
FIG. 7 is a cross-sectional view taken across section-indicating lines 7—7 in FIG. 3.
Figure 8:
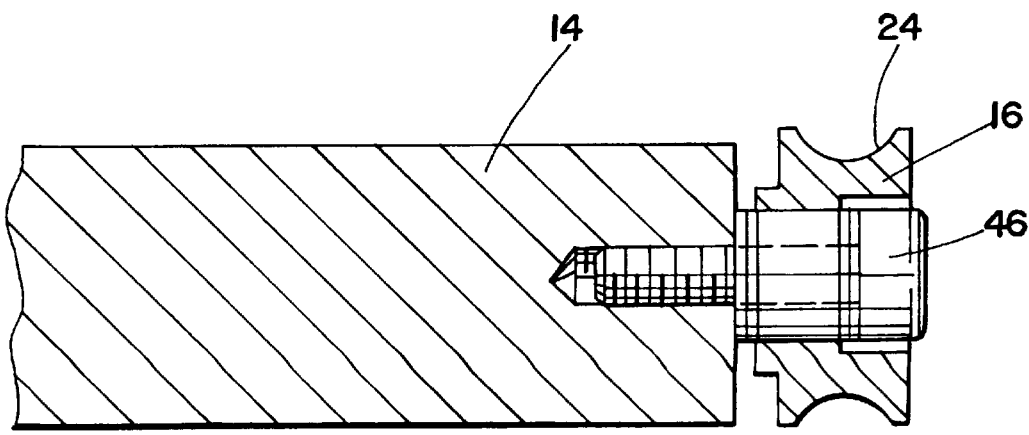
FIG. 8 is a cross-sectional view taken across section-indicating lines 8—8 in FIG. 3.

The body member 12 is generally rectangular in cross section in the direction transverse to the direction of travel of the transfer device 10 along the conveyor or assembly line. Body member 12 is provided with a flanged surface 26 across its front portion 28, as shown in FIGS. 4 and 6. Flanged surface 26 is an extension of the top surface 30 of body member 12. A substantially flat bumper 32, made from urethane or the like, is affixed to the underside 34 of the flanged surface 26 by fasteners 36. The complementary grooves 20 provided on the bottom surface 22 of the body member 12 are substantially parallel to one another and parallel to the side surfaces 38 of body member 12. The rear bumper member 14 is attached the rear surface 40 of the body member 12 and has a top surface 42 which is inclined upwardly toward the rear surface 40 of the body member 12. An idler wheel 16 is attached to each of the oppositely disposed ends 44 of the rear bumper member 14 by means of a shoulder screw 46 which permits the rotation of the idler wheels 16 thereon. A groove 24 is provided within and around the periphery of each idler wheel 16 and is aligned with the adjacent complementary groove 20 in the bottom surface 22 of the body member 12. In this manner, a belt 18 is received in a groove 24 in an idler wheel 16 and in its adjacent aligned complementary groove 20 in the bottom surface 22 of the body member 12.

Referring now to FIGS. 9–11, a "stopped" transfer device 10 is shown by the numeral 60, whereas a laterally "moving" transfer device 10 is shown generally by the numeral 70. As "moving" transfer device 70 approaches "stopped" transfer device 60, bumper 32 affixed to the flanged surface 26 on the front of the "moving" transfer device 70 contacts the top surface 42 of the rear bumper member 14 on the "stopped" transfer device 60 causing bumper 32 on the front of the "moving" transfer device 70 to move laterally on the top surface 42 of the rear bumper member 14 on the "stopped" transfer device 60. The bumper 32 on the front of the "moving" transfer device 70 and the top surface 42 of the rear bumper member 14 on the "stopped" transfer device 60 minimize any shock to the transfer devices 60, 70, upon contact, and to the parts or components being transported by same. Since the top surface 42 of the rear bumper member 14 on the "stopped" transfer device 60 is inclined upwardly, lateral movement of bumper 32 on the front of the "moving" transfer device 70 relative to the top surface 42 of the rear bumper member 14 on the "stopped" transfer device 60 causes body member 12 of "moving" transfer device 70 to move slightly upwardly causing the complementary grooves 20 on the bottom surface 22 thereof to become disengaged from the belts 18. The belts 18 continue to move laterally causing the idler wheels 16 on "moving" transfer device 70 to rotate, however, since body member 12 of "moving" transfer device 70 has moved slightly upwardly, the belts 18 do not contact the complementary grooves 20 in the bottom surface 22 thereof minimizing or eliminating wear to the belts 18 and to the bottom surface 22 of the transfer device 70. It should be noted that the same effect can be achieved if the "stopped" transfer device 60 is replaced by a stop member on the conveyor line provided that the stop member has an inclined surface on the rear portion thereof which would contact a bumper 32 attached to the underside of the flanged surface 26 on the front surface of the body member 12 of the "moving" transfer device 70.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A pallet type transfer device for transporting parts or components along an assembly line comprising
    a body member having a front surface, a rear surface, and a bottom surface, said body member having at least one groove in said bottom surface;
    a first bumper member operatively attached to said front surface of said body member;
    a second bumper member operatively attached to said rear surface of said body member; and
    at least one idler wheel operatively attached to said body member.

2. The pallet type transfer device as defined in claim 1 wherein said at least one groove is comprised of two longitudinally extending grooves in said bottom surface of said body member.

3. The pallet type transfer device as defined in claim 2 wherein said two longitudinally extending grooves are substantially parallel to one another and are positioned in a spaced-apart relationship on said bottom surface of said body member.

4. The pallet type transfer device as defined in claim 1 wherein said first bumper member is substantially flat in the lateral and transverse directions.

5. The pallet type transfer device as defined in claim 1 wherein said second bumper member is substantially flat in the transverse direction and inclined in the lateral direction.

6. The pallet type transfer device as defined in claim 5 wherein the surface of said second bumper member is inclined upwardly toward said rear surface of said body member.

7. The pallet type transfer device as defined in claim 1 wherein said at least one idler wheel is comprised of two oppositely disposed idler wheels operatively attached to said second bumper member.

8. The pallet type transfer device as defined in claim 1 wherein said at least one groove in said bottom surface of said body member is comprised of two longitudinally extending spaced-apart grooves and said at least one idler wheel is comprised of two oppositely disposed idler wheels operatively attached to said second bumper member, each of said idler wheels being positioned adjacent to and substantially aligned with one of said longitudinally extending spaced-apart grooves.

9. The pallet type transfer device as defined in claim 1 wherein lateral movement of said first bumper member on said body member of a moving pallet type transfer device relative to said second bumper member on a stopped pallet type transfer device causes said body member of said moving pallet type transfer device to move upwardly causing the disengagement of said at least one groove on said bottom surface of said moving body member with the assembly line while allowing said at least one idler wheel to continue to rotate.

* * * * *